United States Patent [19]
Koppelmann

[11] 3,751,781
[45] Aug. 14, 1973

[54] ADJUSTABLE BURNISHING TOOL
[75] Inventor: Eldo K. Koppelmann, Cumberland, R.I.
[73] Assignee: Amtel, Inc., Providence, R.I.
[22] Filed: Jan. 24, 1972
[21] Appl. No.: 220,295

Related U.S. Application Data
[63] Continuation-in-part of Ser. No. 27,628, April 13, 1970.

[52] U.S. Cl. .............................................. 29/90 R
[51] Int. Cl. ........................................... B21c 37/30
[58] Field of Search .................................... 29/90 R

[56] References Cited
UNITED STATES PATENTS

| | | | |
|---|---|---|---|
| 2,835,958 | 5/1958 | Mock et al. | 29/90 R |
| 2,843,918 | 7/1958 | Koppelmann | 29/90 R |
| 2,069,099 | 1/1937 | Satterthwaite | 29/90 R |
| 2,045,787 | 1/1936 | Maupin | 29/90 R |
| 2,040,440 | 5/1936 | Maupin | 29/90 R |

*Primary Examiner*—Harrison L. Hinson
*Attorney*—Herbert B. Barlow, Herbert B. Barlow, Jr. et al.

[57] ABSTRACT

An adjustable burnishing tool with a mandrel member having a frusto-conical end portion and a roller cage for engagement therewith which receives a plurality of frusto-conical rollers that operate in a planetary system against the mandrel and which includes means for relatively moving the cage and the work while the mandrel moves the rollers into contact with the work and includes a mechanical means to lock the cage in size relation to the work, while the rollers are in contact therewith, and maintain this size adjustment while the roller burnishing tool is moved into the bore hole or around the cylindrical work piece to be burnished.

6 Claims, 12 Drawing Figures

3,751,781

ADJUSTABLE BURNISHING TOOL

CROSS REFERENCE TO RELATED APPLICATION

This case is a continuation-in-part of my copending application Ser. No. 27,628 filed Apr. 13, 1970.

BACKGROUND OF THE INVENTION

Burnishing tools have been provided in the past for compacting surface material of a work piece under pressure which is done principally for the purpose of establishing a high grade finish. The pressure required to perform the burnishing operation is created through the adjustment of the mandrel and rollers in a proper size to establish this necessary pressure. This has been done in the past by fixed adjustments which generally consist of some form of a nut means that operates against a thrust washer and/or thrust bearing that places the sleeve of the roller cage in proper position relative to the mandrel. Proper feeding of the burnishing tool relative to the work is had by disposing the rollers somewhat askew to the axis of the mandrel and work piece so that the rollers move in a helical path and produce self-feeding characteristics of the tool. It would be appreciated that under certain conditions there are parts produced in mass production which do not require tight tolerances as, for example, the cylinders of hydraulic systems in which rings or other members will take up the variations between the pistons and the cylinders that might be produced. However, it is equally important that the surface of the cylinder be provided with a high grade finish such as achieved through the use of roller burnishing. Thus, it is necessary in industry to individually inspect each piece before it is roller burnished since a normally adjusted roller burnishing tool will not be able to accept steel pieces that vary more than two to three thousandths at the most without providing excessive work hardening and possible brittleness to the piece being worked.

SUMMARY OF THE INVENTION

A roller burnishing tool is provided with a mandrel member that has a frusto-conical end portion and a roller cage which contains a plurality of frusto-conical rollers held therein which are associated in pressure engagement with the end of the mandrel member, the cage extending from the rollers and terminating in an abutment. Driving clutch means are affixed to the cage and the upward of the clutch is drivingly connected to a set nut which is threadingly received on the inner end of the mandrel. The set nut is biased towards the end of the mandrel away from the tip and engages the mandrel with a set of threads which are of a different hand than the normal rotation of the mandrel relative to the work piece. When the tool is temporarily held in position by the abutment and forward thrust is placed on the mandrel relative to the work piece, the rollers will expand radially inwardly or outwardly, as the case might be, to contact the work and the planetary action of the rollers relative to the mandrel will begin. The planetary action of the mandrel relative to the cage drives the nut through the clutch against an abutment with the cage and size of the work that is sensed by the rollers is captured by the aforesaid action. The roller burnishing tool will continue to feed thru the work piece with normal planetary action of the rollers by virute of their slight angular inclination relative to the general axis of the mandrel and roller burnishing is accomplished in the usual fashion. The main object, therefore, of the instant invention is to provide an adjustable roller burnishing tool which will size itself to the piece being burnished automatically as the rollers are first placed into engagement with the bore to be burnsihed and then will maintain this size adjustment throughout the burnishing operation.

DESCRIPTION OF ONE EMBODIMENT

Figure 1:
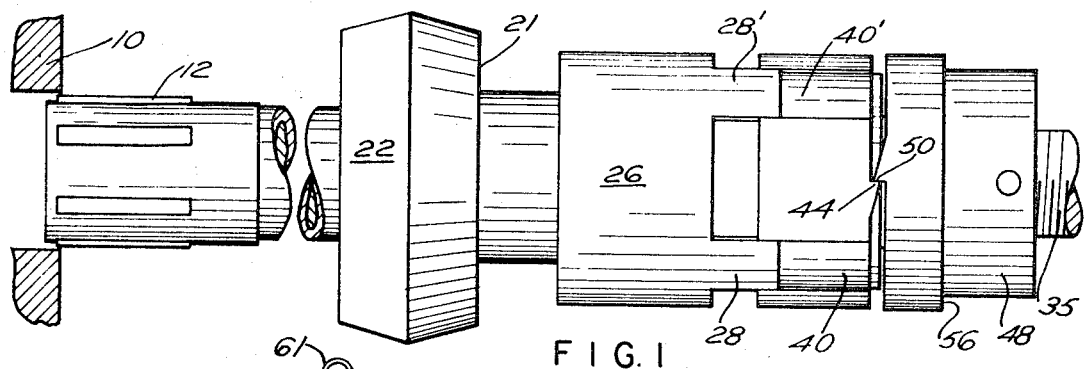
FIG. 1 is an exterior view of a burnishing tool of the ID type embodying the principles of the invention with the housing removed.
Figure 2:
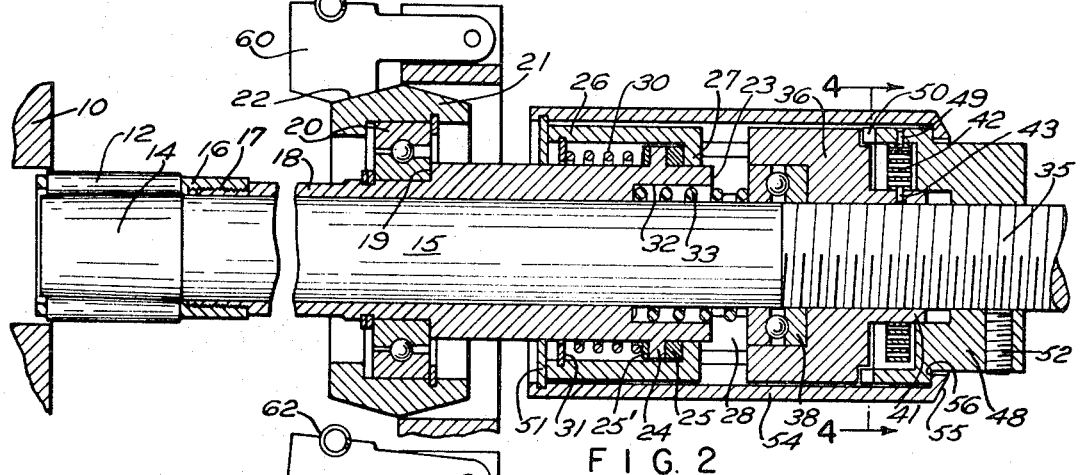
FIG. 2 is a central sectional view taken longitudinally through the burnishing tool of FIG. 1 with the housing shown.
Figure 3:
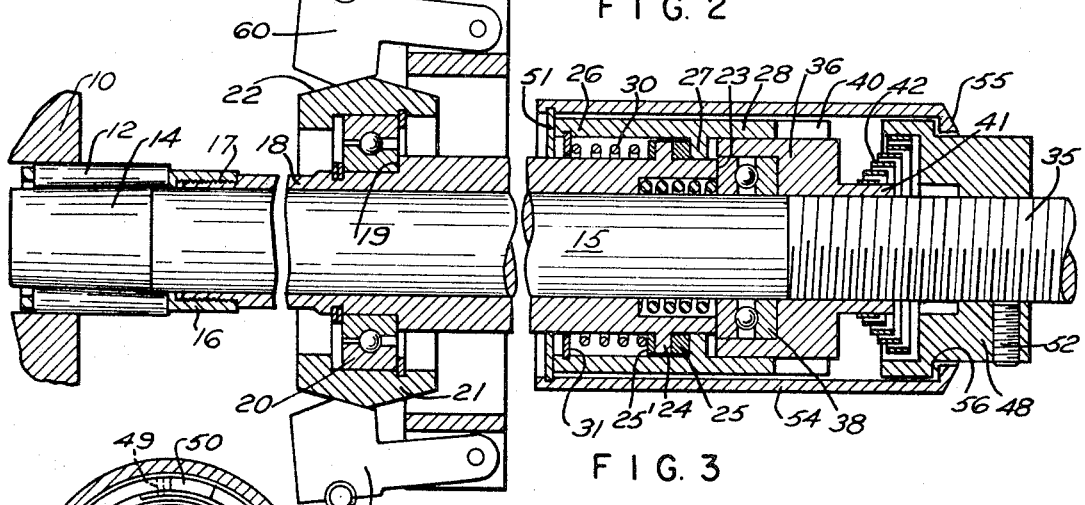
FIG. 3 is a central sectional view of the burnishing tool showing it in operated position during release from engagement by the abutment means.
Figure 4:
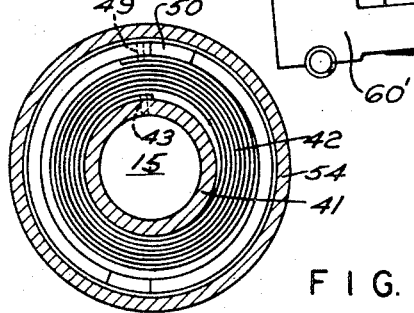
FIG. 4 is a sectional view taken on lines 4—4 of FIG. 2.

The invention will first be described with reference to an ID burnishing tool and by referring more particularly to FIGS. 1, 2 and 3 there is shown a work piece 10 having a cylindrical inner surface which is being contacted by tapered rollers 12 that are maintained thereagainst by a cylindrical frusto-conical end portion 14 of a mandrel member 15. The rollers 12 are disposed within a cage member 16 which for convenience of manufacture is shown as detachably connected as at 17 to a cage sleeve 18. Intermediate the ends of the cage sleeve is a shoulder 19 and abutting on the shoulder 19 is a bearing member 20 which mounts an abutment or stop collar 21 having a tapered outer face 22 the purpose of which will be presently described. The inner end of the cage sleeve terminates in an annular face 23 and slightly inwardly from this face there is provided a collar 24 which extends radially outward from the surface of the cage sleeve. Received on both sides of the collar 24 are clutch rings 25, 25'. A clutch sleeve 26 having an inturned portion 27 is received about the inner end of the cage sleeve and is provided with a plurality of axially extending driving splines 28, etc., the present embodiment utilizing four such splines. The inner face of the inturned portion 27 is maintained in face engagement with the bronze ring 25 by means of a compression spring or clutch spring 30 which presses against the bronze ring 25' and is maintained against the housing of the clutch sleeve by means of a retaining ring 31. A clutch assembly is therefore composed of collar 24, rings 25, 25', sleeve 26, collar 27 and spring 30. The inner end of the cage sleeve is counterbored at 32 and receives a release spring 33 therein.

The inner end of the mandrel 15 is provided with threads 35 of an opposite hand to the normal rotation of the tool. Received on these threads is a set nut 36 which has a counter bore into which is fitted a thrust bearing 38 which is adapted to engage the annular face 23 of the cage sleeve. The outer annular face of the set nut is provided with a plurality of longitudinal slots 40, to receive for sliding engagement the splines 28, etc., there being an equal number of slots corresponding to the number of splines. The set nut has a reduced inner end as at 41 and about this end there is located a torsion spring 42, one end of which is pinned as at 43 to the inner end 41. Adjacent the inner end and on the outer periphery of the set nut there is provided a stop dog 44 (see FIG. 1) the purpose of which will be presently described.

About the innermost end of the mandrel 15 and received on the threads 35 is the main adjusting nut 48. The main adjusting nut is provided at the inner end thereof with a counterbore which receives and embraces the torsion spring 42 one end of which is pinned therto as at 49. The annular surface of the main adjusting nut is also provided with a stop dog 50 (see FIG. 1) and is radially bored to receive a locking screw 52. A housing 54 which has an inturned end as at 55 that engages the shoulder 56 on the main adjusting nut covers the entire adjusting nut, set nut and clutch assembly described above and is retained in position by means of a retaining ring 51 that engages the inner end of the clutch sleeve 26.

To understand how the parts above described are interrelated, the operation of the tool will now be described. By first noticing the angular inclination of the rollers 12 relative to the axis of the tool, it will be appreciated that the rotation of the burnishing tool is clockwise when viewed from the right hand end to the drawing and looking toward the work piece 10. With this set of conditions it should also be appreciated that the threads 35 on the mandrel 15 are of left hand. With this set of parameters the main adjusting nut 48 is set for the nominal largest size of part to be encountered during the burnishing operation which can readily be achieved by loosening the set screw 52 in turning the nut 48 to the proper position. The burnishing tool assembly is then advanced toward the work piece 10 until a slight portion of the forwardmost end of the rollers 12 enters the bore in the work piece 10. With this position reached spring loaded latch means comprising a number of pivoting latches 60, are engaged by the forward surface 22 of the abutment collar 21 with sufficient force to hold the tool in position. The normal operation envisioned that the mandrel 15 will continue to be fed forward by the normal operation of the burnishing operation and also will be turning. The forward movement of the mandrel will expand the rolls 12 outwardly until they engage the bore in the work piece 10. When they engage the work piece 10, the planetary action associated with burnishing, that is the planetary action of the rollers relative to the mandrel will begin and the cage sleeve will now rotate. It should be remembered, however, that as with a normal burnishing operation the mandrel is rotating at a faster speed than the cage sleeve. The cage sleeve, it will be remembered, is coupled through a clutch and through splines 28 to the set nut 36. This coupling is maintained by virtue of the fact that the spring 30 is strong enough to furnish driving clutch action between the collar 24 and the clutch rings to the clutch housing 26, and the arrangement will be such that the set nut 36 is now driven. Since the mandrel is driving faster than the cage, the nut will be moved forwardly until the thrust bearing 38 abuts the annular face 23. The condition that is achieved is that as shown in FIG. 3, and it will be also noted that the torsion spring 42 is of insufficient force to prevent the nut 36 from so rotating. With the position of the cage sleeve now adjusted relative to the mandrel, the planetary action will now self feed the entire assembly including the cage sleeve and its rollers into the bore of the work piece 10 and the axial thrust forces exerted by the cage sleeve in the burnishing operation against the set nut will be so great as to lock the nut in position. With the nut locked the clutch assembly will slip while the tool burnishes the work. As the self feed begins, the latch members 60 will be forced outwardly along the tapered face and against the force of their compression means, which could take the form of an annular spring 62 as shown in FIG. 3 or any other suitable means pressing radially inward and the normal burnishing operation will be achieved. Once the part is completely burnished, the spring 33 operates as a release spring moving the cage sleeve forward relative to the mandrel and the adjusting set nut 36 returns to its normal position under the influence of the torsion spring 42. The nut 36 will always return to the same position by virute of the fact that a stop dog 44 thereon will engage the stop dog 50 on the main adjusting nut.

Figure 5:
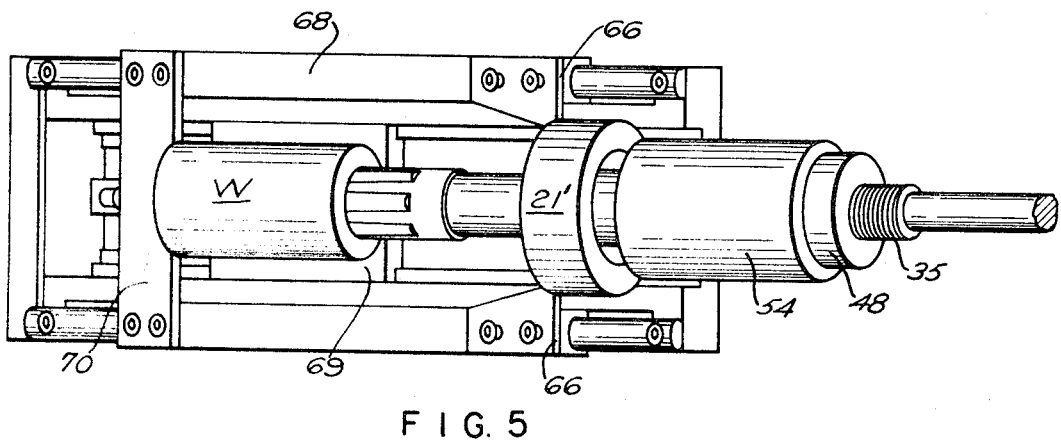
FIGS. 5 and 6 are top views showing a burnishing tool made in accordance with the invention being used in connection with a fixture where the part to be burnished moves relative to the tool rather than the tool moving toward the part.
Figure 6:
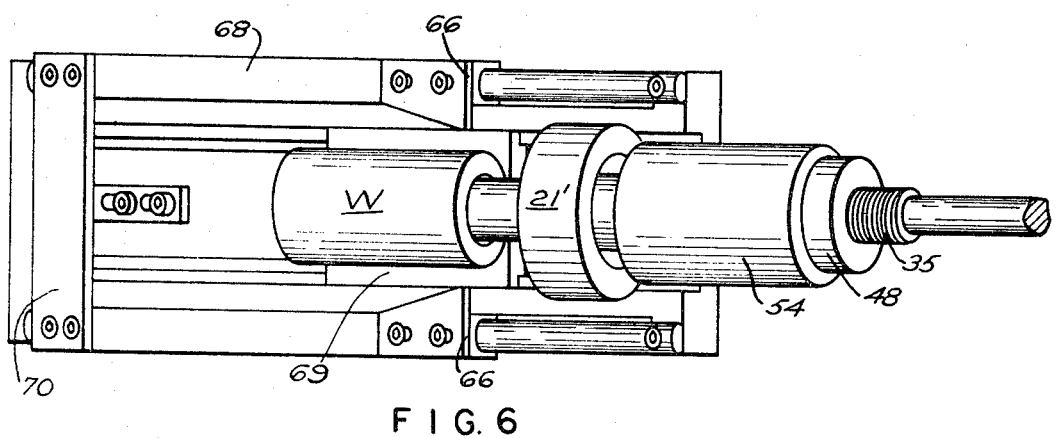

Referring to FIGS. 5 and 6 a method of operating the tool wherein the tool is maintained stationary and the part is moved up thereto is shown. Here instead of utilizing a releasable latch means a positive stop face 66 is provided on a special fixture which is herein shown for exemplary purposes only. In this fixture the abutment collar 21' of the burnishing tool has been slightly re-configured to provide a radially extending face which is adapted to abut the surfaces 66. The part of work W to be burnished, is carried on a torque resisting slide mechanism 69. Another slide 68 which inlcudes the surfaces 66, has a transverse member 70 to engage and move it towards the tool until the surface 66 abuts the collar 21'. This establishes partial entry of the rollers in the bore. Continued feed of the slide 68 will move the cage and cage sleeve rearwardly to expand the rollers and once engagement with the bore is had, the setting operation described takes place, the slide 68 is released and the part may be burnished by virtue of the planetary action that takes place within the tool, the slide returning as shown in FIG. 6. It will be appreciated that the two methods of operating the tool that have been shown are purely by way of example and do not really constitute part of the invention as such.

DESCRIPTION OF ANOTHER EMBODIMENT

Figure 8:
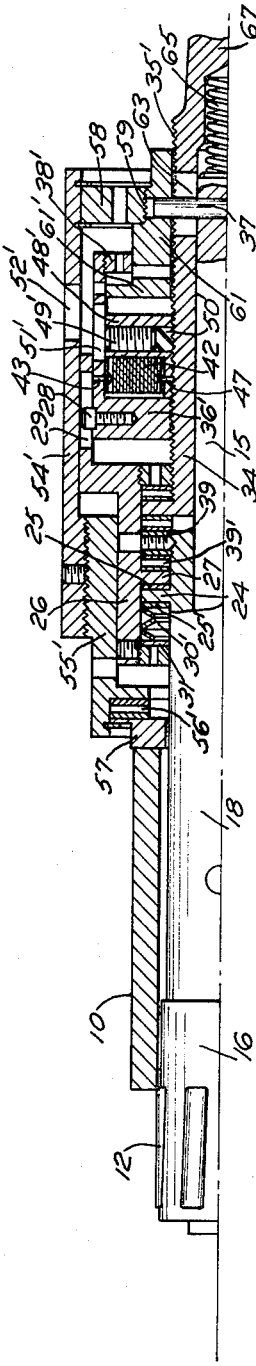
FIG. 8 is a similar section of a half of the tool with the relatively movable parts in a position about to enter the work.

In FIG. 8 there is shown a work piece 10 having a cylindrical bore or inner surface which is being contacted by tapered rolls 12 that are maintained thereagainst by a cylindrical frusto-conical end portion 14 of a mandrel 15. The end portion 14 is screw threaded as at 13 onto the main portion of the mandrel 15 so that different size conical end portions may be utilized. The rollers 12 are disposed in a cage portion 16 which, also for change of size, is screw threaded as at 17 onto a cage sleeve 18. The larger portion of the conical portion 14 is at the extreme outer end, and the tool with the rollers contacted is positioned by being passed through the bore in the work which is to be burnished and drawn back through the work as burnishing occurs.

Inwardly from the inner end of the cage sleeve, there is a collar 24 which extends radially outwardly from the surface of the cage sleeve. Received on both sides of the collar are clutch rings 25 and 25' and about this collar and clutch rings 25 and 25' there is clutch sleeve 26 having a radially inwardly extending rib or collar 27 which is maintained in facing engagement with the bronze ring 25 by means of an axially acting Belleville spring clutch spring 30', which presses against the bronze ring 25' and is maintained against the housing of the clutch sleeve by means of a retaining ring 31. A clutch assembly is therefore composed of collar 24, springs 25, 25', sleeve 26, collar 27 and spring 30'. The inner end of the cage sleeve has threaded thereon a place 39 and between this plate and the collar 27 there is a thrust bearing 39'.

A mandrel sleeve 34 is threaded on its outer surface as at 35' in opposite hand to the normal rotation of the tool. This mandrel sleeve 34 is slidingly non rotatably held to the mandrel 15 by a pin 37 and on the threads of this mandrel sleeve there is a set nut 36' which is counterbored as at its end remote from the clutch and theradedly receives an abutment plate 38' at its end. There is housed in this counterbore, a nut 48' having threaded engagement with the threads on the outer surface of the mandrel sleeve 34, this nut being held in its adjusted position on the mandrel sleeve by a set screw 49' being screwed against the nylon block 50' urging it into contact and in firm engagement with the threads on the mandrel sleeve 34. Access to this set screw 49' is had through slots 51' in nut 36' and slot 52' in housing 54. By turning this nut to various positions, the size to which the rollers 12 may be expanded is determined as this governs the amount that the nut 36 through its abutment 38' may be moved forwardly. A torsion spring 42 is pinned as at 43 to the nut 36' at one end and to the nut 48' at the other end as at 47 as will be explained more fully in the operation of the device.

A housing comprising two cylindrical members 54' and 55' threaded together embrace the working parts heretofore described. This member 55' carries a thrust bearing 56' and a thrust plate 57 at its end to engage the work 10. At its end remote from the work a closure 58 extends inwardly, being held in position by spring rings, and this plate threadingly engages as at 59 a connecting member 61 which embraces the threaded mandrel sleeve 34 and extends into the counterbore of the nut 36' with a flange 61' at its end for engagement with the nut 48' which flange also forms a stop for engagement of the abutment 38' to limit the forward movement of the nut 36' as it is fed when the planetary motion of the rollers in the cage feed this nut forward. Pin 37 which moves in a slot 63 in the mandrel sleeve also secures this connecting member 61 to the mandrel 15. A spring 65 engaging the end of the mandrel 15 and acting between the mandrel and the mandrel sleeve 34 urges these parts in opposite direction and permits the movement of the pin 37 in the slot 63.

Figure 7:
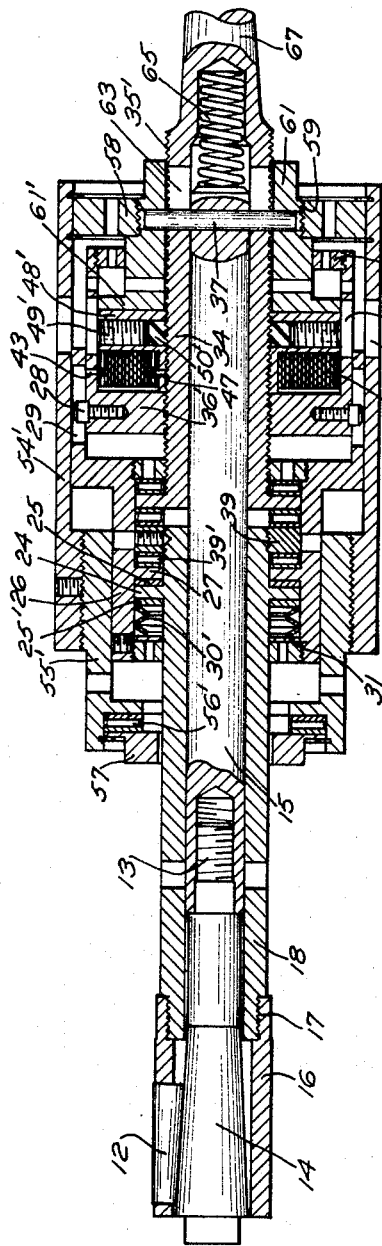
FIG. 7 is a longitudinal sectional view through a modified tool with the movable parts in a contracted position.
Figure 9:
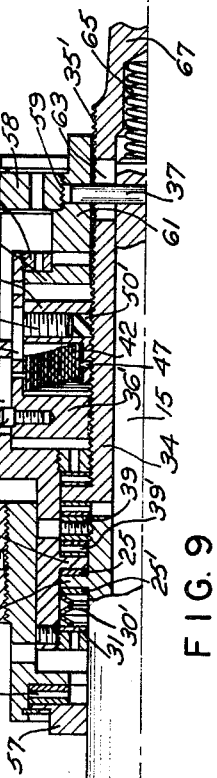
FIG. 9 is a view similar to FIG. 8 with the burnishing rolls in the work during burnishing.

In operation pressure on the driving end 67 of the mandrel sleeve will push the housing and the thrust plate 57, which engages the work, so that the work will be moved to contact the rollers 12 which will be expanded by the conical portion 14 which will be held stationary or relatively moved to the right as shown in the drawing thus causing contact of the rollers with the interior surface of the work 10 whereupon planetary action of the rollers in its cage will occur and, as the rollers are inclined slightly to an axis parallel to the axis of rotation, there will be a helical motion imparted and a normal feeding of the rollers into burnishing operation. As this occurs, the drive through the roller sleeve will cause, through the clutch heretofore described, a drive of the clutch sleeve 26 and through the slot 29 and pin 28 on the nut 36' a drive of the nut and as the threads are of a different hand than the rotation and the mandrel is rotating faster than the sleeve, the nut will be caused to move forward until its abutment portion 38 engages the flange 61' which then is up against the stop nut 48' which then is locked on the mandrel sleeve and thus will limit further forward motion of the nut 36' whereupon all of the parts will then be locked together. A slipping action of the clutch occurs when there is the abutting engagement of the nut with the parts 61 as the burnishing operation continues after the abutments are engaged, and the burnishing will take place through the bore in the work in the normal fashion. When the rolls have passed through the bore, axial pressure will be released, the parts will no longer be bound in position and the torsion spring which has moved from the position shown in FIG. 7 to the position shown in FIG. 9 will return the nut 36' to initial or starting position.

Figure 10:
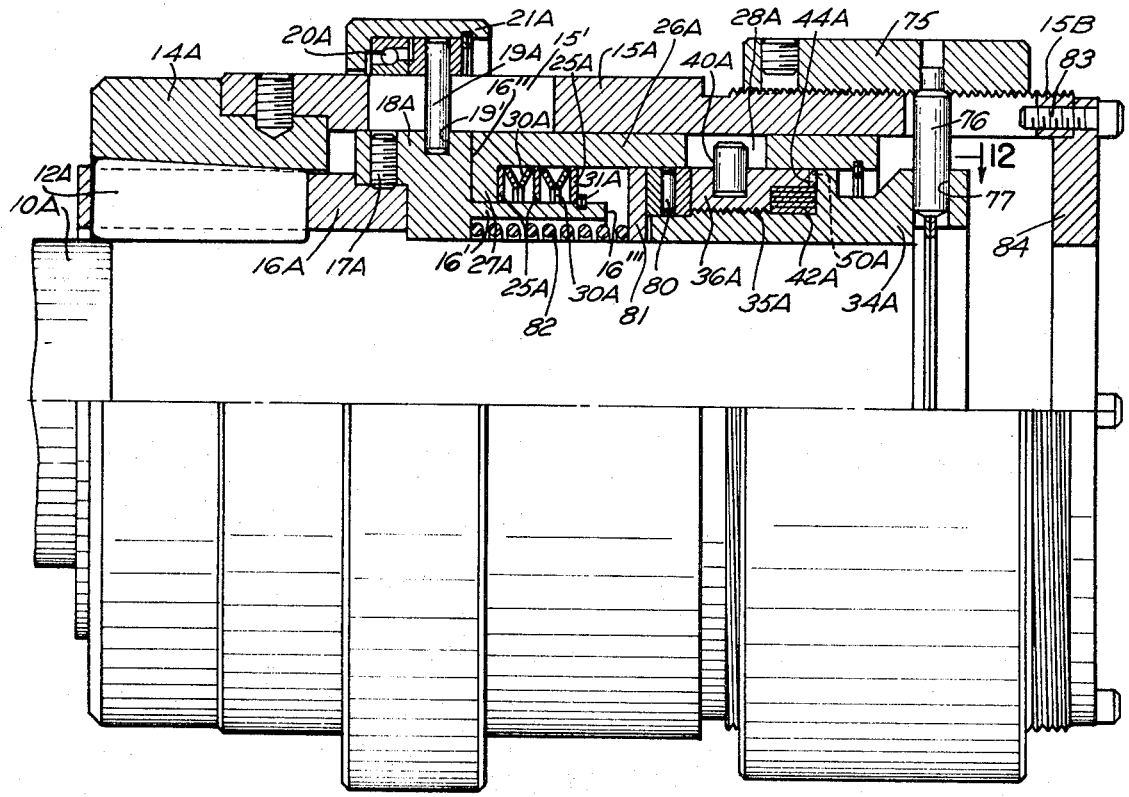
FIG. 10 is a fragmental sectional view of a further modified tool for burnishing the outer cylindrical surfaces of a work piece.

There is illustrated in FIG. 10 a version of an outside diameter roller burnishing tool where a workpiece 10A has an external surface which is contacted by the rollers 12A that are maintained thereagainst by an end member 14A of a mandrel member 15A. The end member 14A is conveniently shown as detachable from the main portion of the cylindrical mandrel member 15A which, as will be seen, extends substantially for the full length of the working part of the tool and terminates at the end remote from the frusto end portion 14A with a threaded section 15B. The rollers 12A are disposed within a cage portion 16A which is detachably connected as by a set screw 17A to the bronze cage sleeve 18A for change of size. Mounted to the cage 16A is a stop collar 21A which is connected to the cage by a plurality of outwardly extending pins such as 19A that protrude through slots 15' in the mandrel member 15A and are received in an annular groove 19' of the cage sleeve 18A. The stop collar 21A is rotatably mounted about the mandrel member 15A and to this end a bearing 20A which mounts about the mandrel member 15A is provided so that rotational movement may be readily had between these two parts since the mandrel member 15A does not rotate at the same speed as the cage sleeve 18A.

A clutch sleeve 26A is received within the mandrel sleeve 15A having a radially inwardly extending collar 27A and about a projection 16' of the cage sleeve are bronze clutch rings 25A and springs 30A which are shown in the form of Belleville washers and which are retained in position by a retaining ring 31A. The clutch springs 30A provide a force pushing the part 26A through collar 27A toward the face 16" of the cage sleeve 18A. It will be noted that the clutch sleeve 26A extends toward the opposite end of the body and has at least one, but preferably a plurality of slots 28A which receive the pin 40A as will presently be described.

The mandrel 15A has a coupling collar 75 threadingly received on threads 15B and extending from this coupling collar radially inward are a plurality of coupling pins 76 which are received in socket 77 of a mandrel sleeve or innerextension 34A which is provided with threads as at 35A of the opposite hand from the normal rotation of the tool. Received on these threads 35A is a nut 36A and it will be seen by virtue of the pins 40A a coupling is had between the nut 36A through the pin 40A and slot 28A to the clutch sleeve 26A so that common rotational movement is had therebetween. At the forward end of nut 36A is a thrust bearing 80 which engages a plate 81 urged rearwardly by a helical spring 82 acting between the cage sleeve and the mandrel sleeve. At the rearward end of the nut 36A is a stop dog 44A which engages a similar dog 50A on the mandrel part 34A in the same fashion as the parts 44 and 50 of the embodiments of FIGS. 1 thru 4 engage.

A spring 42A has one end thereof fastened to the nut 36A and the other end thereof fastened to the mandrel piece 34A and this spring 42A acts in the same manner as the spring 42 acting as a nut reset spring after the parts have relatively moved.

The tool body is provided with a plruality of axially extending holes such as 83 to which a fixture attachment 84 of any particular description may be fastened for mounting the tool with respect to the part to be worked.

Figure 11:
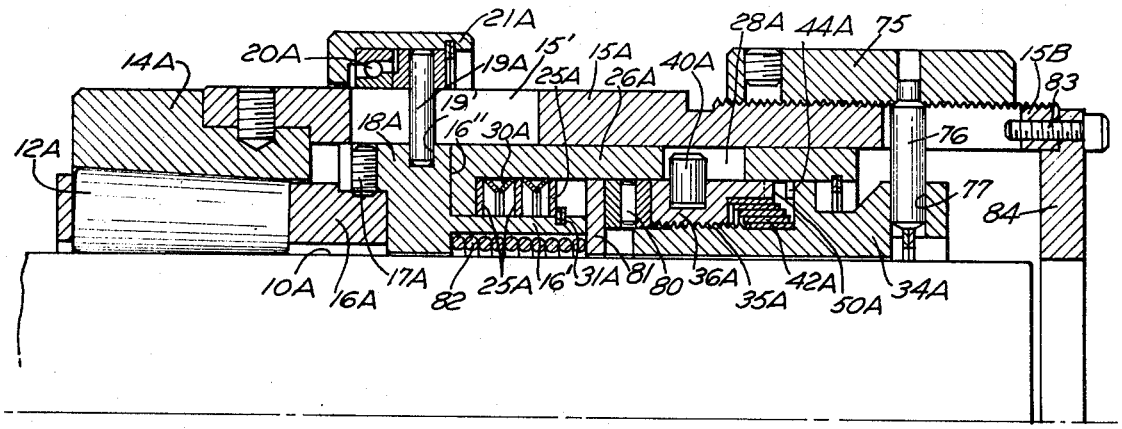
FIG. 11 is a view similar to FIG. 10 with the movable parts in a different position.
Figure 12:
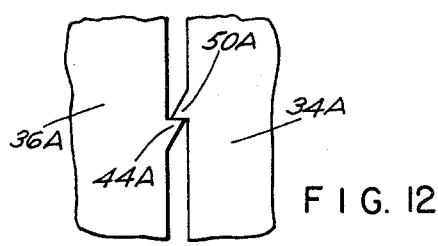
FIG. 12 is a view on line 12 of FIG. 10 looking at the nut 36A and its stop dog 44A.

FIG. 11 shows the forward movement of the mandrel relative to the position on the work as shown in FIG. 10. In this position it will be noted that the nut 36A has been driven toward the face 16''' of the cage sleeve to engage the same, this action occurring in the same fashion as in connection with the embodiment of FIGS. 1–3. It is in this position of the parts that the planetary action of the rollers will feed on the work. Once the part is completely burnished the spring 42A will operate as a release spring permitting the adjusting nut 36A to return to its normal position and enabling the cage and the mandrel to reach a relative positon of disengagement with the part. As in the previous emboidments the nut 36A will return to the same position by virtue of the fact that a stop dog 44A will engage the stop dog 50A as seen in FIG. 12.

I claim:

1. A roller burnishing tool comprising a mandrel member having a frusto-conical end portion, a roller cage member having a plurality of frusto-conical rollers held therein at an angle to the axis of said cage which constitute a group of rollers that are in contact with the end portion of the mandrel member to establish a diameter, means to hold one of said members relative to the other at a diameter of the workpiece, the rollers being in contact with the workpiece, a coupling including a nut and a threaded joint of a hand opposite the rotational hand of the tool between said members, said coupling also including a clutch whereby the planetary action of the rollers driving the cage will in turn rotate the nut through the clutch to establish burnishing pressure.

2. A roller burnishing tool as in claim 1 wherein the clutch is coupled to the nut for rotation but permits axial movement therebetween.

3. A roller burnishing tool as in claim 2 wherein the nut is threadingly mounted on the mandrel and has means affixed thereto to torsionally bias it against rotation.

4. A roller burnishing tool as in claim 1 wherein the roller cage receives and encircles the frusto-conical mandrel end portion.

5. A roller burnishing tool as in claim 1 wherien the frusto-conical mandrel end portion encircles the cage.

6. A roller burnishing tool comprising a mandrel member having a frusto-conical end portion, a roller cage having a plurality of frusto-conical rollers held therein at an angle to the cage axis which constitute a group of rollers that are in contact with the end portion of the mandrel member to establish a diameter, a cage sleeve extending from said cage, abutment means fixed to the cage sleeve, clutch means, the inner end of the mandrel having thread means of a hand opposite the driven rotation of the mandrel member, a nut threadingly enagaging the thread means, the clutch means drivingly engaging the nut, means biasing the nut against rotation whereby when the mandrel is driven and the cage is held temporarily in positon by the abutment the forward thrust of the mandrel relative to the work forces the rollers into engagement with the work and the faster rotation of the mandrel relative to the cage drives the nut through the clutch into abutment with the cage sleeve, thus sizing the diameter rollers to the work.

* * * * *